United States Patent
Patel et al.

(10) Patent No.: US 10,375,443 B2
(45) Date of Patent: Aug. 6, 2019

(54) METHOD FOR ENHANCING A USER VIEWING EXPERIENCE WHEN CONSUMING A SEQUENCE OF MEDIA

(71) Applicant: Rovi Guides, Inc., Santa Clara, CA (US)

(72) Inventors: Milan Patel, Santa Clara, CA (US); John Patterson, Marlow Bucks (GB); Charles Dawes, Ryton (GB); Jerry Vennerholm, Warlingham (GB); Andrew Hunter, London (GB); Gavin Clarke, London (GB)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 14/815,119

(22) Filed: Jul. 31, 2015

(65) Prior Publication Data

US 2017/0034578 A1 Feb. 2, 2017

(51) Int. Cl.
| | |
|---|---|
| *H04H 60/32* | (2008.01) |
| *H04N 21/454* | (2011.01) |
| *H04N 21/442* | (2011.01) |
| *H04N 21/45* | (2011.01) |
| *H04N 21/458* | (2011.01) |
| *H04N 21/482* | (2011.01) |
| *H04N 21/44* | (2011.01) |
| *H04N 21/432* | (2011.01) |
| *H04N 21/433* | (2011.01) |

(52) U.S. Cl.
CPC ......... *H04N 21/454* (2013.01); *H04N 21/432* (2013.01); *H04N 21/433* (2013.01); *H04N 21/44008* (2013.01); *H04N 21/44204* (2013.01); *H04N 21/44218* (2013.01); *H04N 21/458* (2013.01); *H04N 21/4532* (2013.01); *H04N 21/4542* (2013.01); *H04N 21/482* (2013.01)

(58) Field of Classification Search
CPC .......... H04N 21/854; H04N 21/44008; H04N 21/44204; H04N 21/44218
See application file for complete search history.

(56) References Cited

U.S. PATENT DOCUMENTS

| | | | |
|---|---|---|---|
| 6,771,316 B1 | 8/2004 | Iggulden | |
| 9,418,296 B1 * | 8/2016 | Kansara | G06K 9/00744 |
| 2004/0045020 A1 * | 3/2004 | Witt | H04N 7/163 725/13 |
| 2004/0226035 A1 | 11/2004 | Hauser | |
| 2004/0244035 A1 * | 12/2004 | Wright | H04H 20/28 725/32 |
| 2008/0131077 A1 | 6/2008 | Jones et al. | |
| 2009/0103886 A1 | 4/2009 | Kataoka | |
| 2010/0192106 A1 | 7/2010 | Watanabe et al. | |
| 2012/0020647 A1 * | 1/2012 | Vogel | H04N 5/765 386/251 |

(Continued)

FOREIGN PATENT DOCUMENTS

WO WO-2011/039773 A2 4/2011

*Primary Examiner* — Olugbenga O Idowu
(74) *Attorney, Agent, or Firm* — Haley Guiliano LLP

(57) ABSTRACT

Methods and systems are described for a media guidance application that enhances the viewing experiences of users consuming a sequence of media. In particular, the media guidance application may enhance the viewing experiences of users consuming a sequence of media by removing portions of redundant media that were previously consumed by the user.

14 Claims, 5 Drawing Sheets

(56) References Cited

U.S. PATENT DOCUMENTS

2014/0020017 A1* 1/2014 Stern ............... H04N 21/23611
                                                        725/34
2014/0255004 A1   9/2014  Allen et al.
2014/0282673 A1   9/2014  Neumeier
2014/0325552 A1  10/2014  Evans et al.
2015/0163545 A1   6/2015  Freed et al.

* cited by examiner

METHOD FOR ENHANCING A USER VIEWING EXPERIENCE WHEN CONSUMING A SEQUENCE OF MEDIA

BACKGROUND

In conventional systems, users typically have access to a wide range of media. After consuming first media, a user may consume second media in which the second media may contain content overlapping with the first media. As the user has already consumed the overlapping content, the user may not desire to consume the overlapping content again. A conventional system will present the second media to the user with the overlapping content, thus frustrating the user as they need to manually fast-forward or skip the overlapping content to avoid consuming it again.

SUMMARY

Accordingly, methods and systems are described herein for a media guidance application that enhances a viewing experience of a user when viewing multiple media having overlapping content. In particular, the media guidance application may reduce the amount of time a user wastes consuming overlapping content by identifying content in previously consumed media that overlaps with content in media requested for consumption by the user and reducing the amount of overlapping content in the media requested for consumption by the user. The media guidance application may skip or fast-forward through the overlapping content during playback of the media requested for consumption by the user. For example, the media guidance application may access a user profile to identify content (e.g., a title sequence of a previously-viewed episode of a series) already watched by a user. If the media guidance application detects that a user is about to watch the identified content again (e.g., the user is about to watch another episode of the series that includes the title sequence), the media guidance application may skip or automatically fast-forward through the identified content during playback of the other episode.

In some aspects, the media guidance application may retrieve a user profile indicating a user previously consumed a first media asset. For example, upon playback of a media asset, the media guidance application may write data indicating that the user has consumed the media asset to a remote or local data storage location corresponding to a user. The media guidance application may access the local or remote data storage location to retrieve data corresponding to previously consumed media assets and may identify a first media asset previously consumed by the user from a plurality of media assets.

The media guidance application may detect that the user is about to consume a second media asset. For example, the media guidance application may be configured to receive and process user inputs. Upon receiving a user input, the media guidance application may determine that the user input corresponds to a request to consume a second media asset. As an example, the media guidance application may be configured to interpret a user input from a remote control, a touch screen device, a network data packet, etc.

The media guidance application may compare the second media asset to the first media asset to determine whether a portion of the second media asset matches content from the first media asset. For example, the media guidance application may identify a portion of the second media asset for a comparison to the first media asset. In some embodiments, the media guidance application may monitor user behavior of a population of users who consume the second media asset after consuming the first media asset. For example, the media guidance application may log, in a database, actions performed by users who consume the second media asset after consuming the first media asset. In response to the monitoring, the media guidance application may analyze the log to identify a portion of the second media asset corresponding to fast-forward behavior by a threshold number of users in the population. The media guidance application may select the identified portion of the second media asset as the portion. In some embodiments, the media guidance application may identify a frame of the second media asset as the portion. For example, the media guidance application may select an image corresponding to the media asset as the portion. In some embodiments, the media guidance application may select a plurality of frames from the second media asset as the portion. For example, the media guidance application may select the first N frames of the second media asset, wherein N is a number greater than 1. In some embodiments, the media guidance application may select a portion wherein the portion is preceded by a second portion of the second media asset during playback of the second media asset. For example, the media guidance application may select a frame of the second media asset wherein the selected frame is rendered after at least one other frame during playback of the second media asset.

In response to determining that the portion of the second media asset matches the content from the first media asset (e.g., determining that a user has already consumed a portion of the second media asset), the media guidance application may edit the second media asset to remove the portion (e.g., in order to prevent the user from having to manually skip or fast-forward the portion) and generate for display the edited second media asset (e.g., a version of the second media asset without the content previously viewed by the user).

In some embodiments, the media guidance application may determine a frame of the second media asset that corresponds to the portion for comparing the second media asset to the first media asset. For example, the media guidance application may select an image associated with the portion of the second media asset. In some embodiments, the media guidance application may cross-reference the frame with a database listing a plurality of frames of the first media asset to determine whether the frame matches one of the plurality of frames. For example, the media guidance application may access a database containing images associated with the first media asset. The media guidance application may compare the images associated with the first media asset to the image associated with the portion to determine if an image associated with the first media asset matches the image associated with the portion. In some embodiments, frames may be associated with audio signals. For example, a frame of multimedia may be associated with both an image and an associated sound. The media guidance application may compare the frame of the portion and a frame of the first media asset by accessing a database of frame audio and video data and cross-reference image and audio data associated with the frame of the portion with image and audio data associated with a frame of the first media asset. In some embodiments, the frame may contain only audio data. The media guidance application may compare the frame of the portion and a frame of the first media asset by accessing a database of frame audio data and cross-reference audio data associated with the frame of the portion with audio data associated with a frame of the first media asset.

In some embodiments, the media guidance application may retrieve metadata corresponding to the portion of the second media asset for comparing the portion to the first media asset. For example, the media guidance application may retrieve data associated with the portion by identifying characteristics of the portion, such as actors, scenes, genres, etc. associated with the portion. The media guidance application may cross-reference the metadata of the portion with a database listing metadata of the first media asset to determine whether the portion matches the content from the first media asset. For example, the media guidance application may access a database of actors, scenes, genres, etc. associated with the first media asset. The media guidance application may cross reference metadata in the database with the metadata corresponding to the portion to identify matching metadata.

In some embodiments, the media guidance application may retrieve an event corresponding to the portion for comparing the portion to the first media asset. For example, the media guidance application may retrieve a data tag associated with the portion containing information about an event that occurs within the portion (e.g., a tag for an episode of a talent show may identify a performer and a talent act corresponding to the portion). The media guidance application may cross-reference the event of the portion with a database listing a plurality of events corresponding to the first media asset to determine whether the portion matches content from the first media asset. For example, the media guidance application may access a database containing data identifying a plurality of tags associated with the first media asset. The media guidance application may compare the tag (e.g., data identifying a performer and a talent act) associated with the portion with the tags in the database to determine if the tag (e.g., data identifying a performer and a talent act) of the portion matches a tag associated with the first media asset.

In some embodiments, the media guidance application may identify an episode of a series associated with the portion and an episode of a series associated with the first media asset. For example, the media guidance application may access a database to identify an episode of a series associated with a portion of the second media asset that recaps events from a previous episode. In some embodiments, the media guidance application may compare the episode of the series associated with the portion to the episode of the series associated with the first media asset. For example, the media guidance application may access a database containing episode and series information for media assets to determine an episode of a series associated with the first media asset. The media guidance application may compare the portion and the first media asset by determining whether the respective episodes of the series are equal.

In some embodiments, the media guidance application may edit the second media asset to remove the portion in response to determining that the portion of the second media asset matches the content from the first media asset. For example, the media guidance application may remove frames corresponding to the portion from the second media asset, such that the frames corresponding to the portion will not be generated for display by the media guidance application during playback of the edited second media asset.

In some embodiments, the media guidance application may generate for display the edited second media asset. For example, the media guidance application may generate image data (e.g., for display on a display screen associated with the media guidance application) and/or sound data (e.g., for a speaker associated with the media guidance application) corresponding to the edited second media asset, such that less than all of the portion is generated for display during playback of the second media asset.

In some embodiments, the media guidance application may generate an edited portion by increasing a perceived playback speed of the portion. For example, the media guidance application may generate an edited portion containing a fraction of an original number of frames of the portion (e.g., every fourth frame of the portion). The media guidance application may playback the edited portion at an equivalent frame rate as the portion such that the edited portion is perceived, by the user, as a sped up version of the portion. The media guidance application may edit the second media asset to replace the portion with the edited portion. For example, the media guidance application may play back the edited portion instead of playing back the portion during playback of the second media asset.

In some embodiments, the media guidance application may present the user with an option to view the portion removed from the second media asset. For example, the media guidance application may prompt the user as to whether the portion should be skipped, played at a faster rate or if the portion should be rendered during playback of the second media asset.

It should be noted that the systems and/or methods described above may be applied to, or used in accordance with, other systems, methods, and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF DRAWINGS

Figure 1:
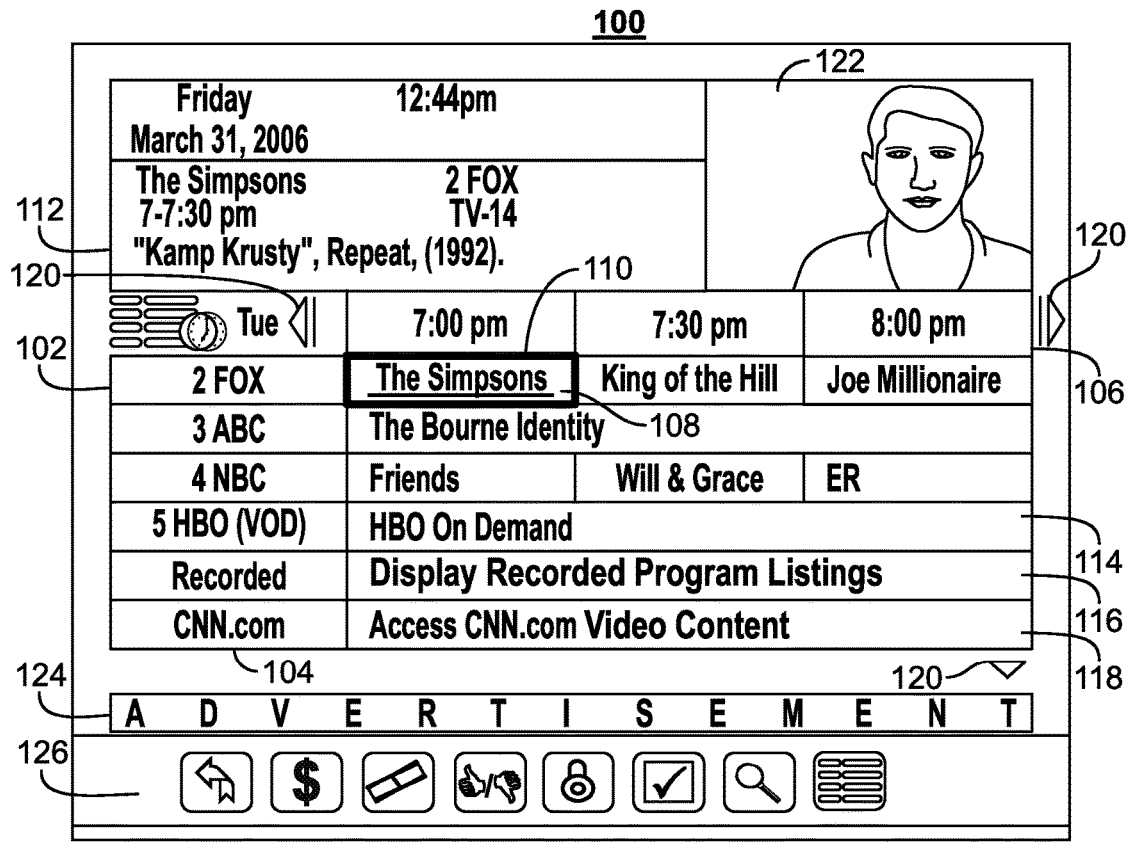
FIG. 1 shows an illustrative example of a media guidance display that may be presented in accordance with some embodiments of the disclosure.

Methods and systems are described herein for a media guidance application that enhances a viewing experience of a user when viewing multiple media assets having overlapping content. In particular, the media guidance application may reduce the amount of time a user wastes consuming overlapping content by identifying content in previously consumed media overlapping with content in media requested for consumption by the user and reducing the amount of overlapping content in the media requested for consumption by the user.

As referred to herein, "overlapping content" refers to data in first media that is similar to, or equal to, data in second media. For example, a first and a second media are said to have overlapping content if images, sounds, metadata, etc. match or are similar by at least a threshold value. For example, a first media having a frame that matches a frame of a second media by 95% (e.g., 95% of the pixels in the frame match) may be determined by the media guidance application to be overlapping. Overlapping content may correspond to distinct portions of media assets. For example, overlapping content may correspond to a title, intro, or credits sequence, may correspond to a video/clip recap, may correspond to a commercial or advertisement, and/or may correspond to another frame or scene in a media asset.

As referred to herein, a "frame" may be any image and/or sound associated with media. For example, a frame of a movie may be an image and a sound captured at a specific point in the movie. In another example, a frame of a song may be audio data associated with a specific sample of the song. The media guidance application may skip or fast-forward through the overlapping content during playback of the media requested for consumption by the user. For example, the media guidance application may access a user profile to identify a first media asset previously consumed by the user. The media guidance application may detect a user request to consume a second media asset. In response to the detection, the media guidance application may compare a portion of the second media asset to the first media asset to determine if the portion overlaps with content in the first media asset. The media guidance application may edit the second media asset such that the portion is skipped or fast-forwarded through during playback of the second media asset.

As referred to herein, a "media guidance application" is an application that enables users to access media content through an interface. Media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Media guidance applications may generate graphical user interface screens that enable a user to navigate among, locate and select content.

The media guidance application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Media guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

In some embodiments, the media guidance application may retrieve a user profile indicating a user previously consumed a first media asset. The media guidance application may determine whether a user profile exists by first identifying the user (e.g., login information, a picture of the user (e.g., gained through a webcam), a hash value uniquely identifying the user or any other known identifying information of the user), and then by cross referencing the user's identity against entries of a user profile database. As a result of the cross referencing, the media guidance application may receive a pointer to a profile if one is located or may receive a NULL value if the profile does not exist. The user profile database may be located remotely or locally with respect to the media guidance application and may be accessible to the media guidance application over a network connection. If a user profile is located, the media guidance application may access database entries corresponding to previously viewed media by the user. In some embodiments, the media guidance application may store, in the user profile, data indicating all media assets previously viewed by the user. For example, the media guidance application may store a value uniquely identifying a media asset consumed by a user in the profile of the user.

In some embodiments, the media guidance application may update the user profile to include a list of recently viewed media assets. The media guidance application may update the list of recently viewed media assets to comprise only media assets that were consumed by a user more recently than a threshold number of days, minutes, hours, etc. The media guidance application may compare a value storing a time the media asset was last consumed with a value indicating a current date and time to determine if the media asset should be included on the list of recently viewed media assets. In some embodiments, the list of recently viewed media assets may include all media assets consumed by a user. For example, the list may include every media asset viewed by the user since the profile was created by the media guidance application.

In some embodiments, the user can select the threshold value associated with the list of recently viewed media assets. For example, the media guidance application may retrieve the threshold value from the user profile. In some embodiments, the media guidance application may identify a first media asset from the media assets corresponding to the user profile. For example, the media guidance application may identify a most recently consumed media asset in the user profile by comparing the current date and time to a date and time associated with a media asset.

In some embodiments, the media guidance application may iterate through all the previously viewed media assets in the profile. For example, the media guidance application may iteratively select each media asset previously consumed by the user as the first media asset such that each media asset is selected at least once as the first media asset upon completion of the iteration.

In some embodiments, the media guidance application may access a database of metadata associated with a consumed media asset to retrieve metadata associated with the first media asset to make a determination if the media asset should be selected as the first media asset. For example, the media guidance application may access a remote or local database containing information, such as a title, an episode, a series, a listing of actors/actresses, etc. associated with a media asset requested for consumption by the user. The media guidance application may compare metadata of the media asset requested for consumption by the user with metadata of a media asset in the profile of the user to identify a matching media asset comprising metadata matching at least a portion of the metadata of the media asset requested for consumption by the user. The media guidance application may select the matching media asset as the first media asset. For example, the media guidance application may detect a user request to consume media corresponding to the television series "Game of Thrones." The media guidance application may search the user profile for media assets corresponding to the series "Game of Thrones" to select the first media asset.

In some embodiments, the first media asset is selected by the user. For example, the media guidance application may detect user input (e.g., a voice command, an infra red pulse from a remote control, a change in voltage at the surface of a touchscreen, etc.) at an input device associated with the media guidance application. The media guidance application may associate the user input with a media asset associated with the media guidance application. The media guidance application may select the media asset as the first media asset. In some embodiments, the media guidance application may select the first media asset from a list, defined by a user, of media assets. In an example, the media guidance application may generate for display an option for the user to select a list of media assets that the user wants to consume. As the user consumes the media assets from the list, the media guidance application may populate a log of recently viewed media assets from the list. The media guidance application may select a first media asset from the log of recently viewed media assets from the list. In another example, the media guidance application may process the log to iteratively identify a first media asset. In some embodiments, the media guidance application may select a first media asset that has not yet been consumed by the user. For example, the media guidance application may iteratively select a media asset from a list of recorded media assets. In another example, media guidance application may automatically process the list of recorded media assets to identify media assets corresponding to a series matching a series associated with a media asset requested for consumption by the user. The media guidance application may select a first media asset from the identified media assets.

In some embodiments, the media guidance application may detect that the user is about to consume a second media asset. For example, the media guidance application may monitor an input associated with the media guidance application. In an example, the media guidance application may configure the input to interpret signals from input devices such as a microphone, a touchscreen, a mouse, a keyboard, a remote control, a network interface, etc. The media guidance application may interpret the input to correlate the input with a media asset. For example, the media guidance application may detect user input at a touch screen connected to an input associated with the media guidance application. The media guidance application may interpret the touch screen input to identify coordinates of the touch screen corresponding to the user input. The media guidance application may cross-reference coordinates of the touch screen with pixels of a display screen associated with the touch screen to identify a pixel associated with the touch screen input. The media guidance application may cross-reference a location of the pixel with locations of items generated for display by the media guidance application on the display screen to identify a media asset associated with the user input. The media guidance application may identify the user input associated with the media asset as a request to consume the media asset. In another example, the media guidance application may detect user input (e.g., via a remote control) at an infrared input associated with the media guidance application. The media guidance application may identify a "select" command or equivalent associated with the user input. The media guidance application may correlate the "select" command with an item displayed on a display screen associated with the media guidance application to identify a media asset corresponding to the user input. The media guidance application may identify the user input as a request to consume the media asset associated with the user input. In another example, the media guidance application may detect a packet at a network input associated with the media guidance application containing data identifying a request by a user to consume a second media asset.

In some embodiments, the media guidance application may present the user with an option to select a list of media assets requested for consumption. For example, the media guidance application may present the user with an option to generate a playlist of media assets. In some embodiments, the media guidance application may track user consumption of the media assets in the list. For example, the media guidance application may track user consumption of the media assets by removing a media asset from the list after it is consumed by a user. The media guidance application may detect that the second user is about to consume a second media asset by checking whether there are still items on the playlist. One of ordinary skill in the art will realize that these are just exemplary methods for detecting that the user is about to consume a second media asset.

In some embodiments, the media guidance application may compare the second media asset to the first media asset to determine whether a portion of the second media asset matches content from the first media asset. For example, the media guidance application may compare a frame of the second media asset with frames of the first media asset to determine whether the frame of the second media asset matches a frame of the first media asset.

As referred to herein, a "portion" of a media asset may refer to any part of a media asset that is distinguishable from another part of the media asset. For example, a portion may correspond to a frame, set of frames, scene, chapter, etc. The media guidance application may identify distinct portions based on time-marks (e.g., a portion begins at a first time mark and ends at a second time mark) in the play length of a media asset. Alternatively or additionally, the media guidance application may identify portions based on a range of frames (a portion begins at a first frame and ends at a second frame). Alternatively or additionally, the media guidance application may identify portions based on content in the media asset (a portion may begin at the appearance of particular content and end at the appearance of the same or different content). Alternatively or additionally, the media guidance application may identify portions based on metadata associated with the media asset (a portion may begin at a first metadata tag and end at a second metadata tag.

For example, a portion of the second media asset may be a frame or video image associated with the second media asset. In another example, a portion of the second media asset may be metadata, such as data identifying an actor or actress associated with a scene of the second media asset. In another example, a portion of the second media asset may be identified by a time range associated with the second media asset. In another example, the portion of the second media asset may comprise the entire second media asset. In some embodiments, the portion may be preceded by a second portion of the media asset during playback of the second media asset. For example, the second media asset may comprise a second portion such that the second portion precedes the portion during playback of the second media asset. In another example, the second media asset may comprise a third portion wherein the third portion follows the portion during playback of the second media asset.

In some embodiments, the media guidance application may iterate though the second media asset to identify portions of the second media asset. For example, the media guidance application may select a first frame of the second media asset as the portion. The media guidance application may compare the first frame to frames corresponding to the first media asset to identify a matching frame. For example, the media guidance application may employ an image processing algorithm to derive a similarity value between the two frames. If the frames are similar by at least a threshold value, the media guidance application may determine that the frames are a match. The media guidance application may determine the threshold value by querying the user for a threshold or by accessing a variable stored locally or remotely from media guidance application. After the comparison, the media guidance application may select a second frame of the second media asset as the portion and may perform a second comparison.

In some embodiments the media guidance application may determine a frame of the second media asset that corresponds to the portion. For example, the media guidance application may identify a frame of a plurality of frames corresponding to the portion of the second media asset. In some embodiments, the media guidance application may cross-reference the frame with a database listing a plurality of frames in the first media asset to determine whether the frame matches one of the plurality of frames of the first media asset. For example, the media guidance application may select a frame of the first media asset by iterating through the frames in the database. The media guidance application may compare image data of the frame by applying an image processing algorithm to the frames of the first media asset to derive a similarity value. For example, the image processing algorithm may compare pixel data for each pixel in each of the frames. To derive a similarity value, the media guidance application may compute the percentage of pixels that match both frames. If the similarity value is above a similarity threshold, the media guidance application may determine that the frames match. For example, the media guidance application may compare the similarity value to a similarity threshold stored locally to the media guidance application. If the media guidance application determines that the similarity value is above the similarity threshold, the media guidance application equates the frames to a match. Otherwise, the media guidance application determines that the frames do not match.

In some embodiments, the media guidance application may retrieve metadata corresponding to the portion. For example, the media guidance application may retrieve, from a database, data indicating an initial air date of the content in the portion. The content in the portion may correspond to content from another media asset having an initial air date distinct from the second media asset. For example, the portion may correspond to a recap of a previously aired episode of a show. The media guidance application may cross-reference the metadata of the portion with a database listing metadata of the first media asset to determine whether the portion matches content from the first media asset. For example, the media guidance application may cross reference the data indicating an initial air date of the content in the portion with a database listing initial air dates for a plurality of media assets to determine whether the portion matches content from the first media asset.

In some embodiments, the media guidance application may retrieve an event corresponding to the portion. As referred to herein, an "event" may be any data (e.g., a metadata tag, an object appearing in a frame, etc.) associated with a portion of a media asset. For example, the media guidance application may retrieve data indicating a scene or an actor associated with content in the portion. The second media asset may be associated with tags indicating events associated with the second media asset, wherein each of the tags are associated with a time position in the second media asset. The media guidance application may automatically generate tags by applying an image and/or sound processing algorithm on frames of the media asset. For example the media guidance application may identify faces of an actor/actress and an action associated with the actor/actress in the portion. In some embodiments, the media guidance application retrieves tags generated by users of a population of users who watch the second media asset. The media guidance application may access a database listing the tags generated by the users. In another example, a content provider of the second media asset may update and maintain a database of tags associated with the media asset. The media guidance application may access the database associated with the content provider to retrieve a tag. The media guidance application may correlate a time of the portion (e.g., a start time of the portion relative to a time within the second media asset) with a database listing time-tag pairs of the second media asset. The media guidance application may retrieve a tag from the database corresponding to the portion.

In some embodiments, the media guidance application may cross-reference the event of the portion with a database listing events of the first media asset to determine whether the portion matches the content from the first media asset. For example, the media guidance application may retrieve a data tag corresponding to the portion identifying a character and a storyline associated with the character. As an example, the media guidance application may retrieve data indicating that a character gets married in the portion. The media guidance application may cross-reference the tag of the portion with the database listing tags of the first media asset to determine whether the database comprises data indicating that the character got married in the first media asset. If the database comprises data indicating that the character got married in the first media asset then the portion is determined by the media guidance application to match content from the first media asset.

In some embodiments, the media guidance application may identify an episode of a series associated with the portion and an episode of a series associated with the first media asset. For example, a portion may comprise content from an episode of a series distinct from a episode of a series of the second media asset (e.g., a show recap or content from a crossover episode). The media guidance application may access a database listing episodes of a series of associated content in the second media asset. In some embodiments, the media guidance application may capture a frame from the portion, the media guidance application may cross-reference the frame with database of frames of a plurality of episodes of series. For example, the media guidance application may use an image processing algorithm to identify a frame in the database matching the frame of the portion. When the media guidance application identifies a matching frame, the media guidance application will retrieve the episode and series of the matching frame as the episode and series corresponding to the portion. In an example, the media guidance may identify an episode of a series associated with the first media asset by querying a database of media guidance information for an episode of a series associated with the first media asset. For example, the media guidance application may generate a unique identifier for the media asset (e.g., by hashing data corresponding to the first media asset) and may transmit the unique identifier in a query to the database of media guidance information. The media guidance application may receive a response from the database of media guidance information containing an episode of a series associated with the first media asset. The media guidance application may compare the episode of the series associated with the portion to the episode of the series associated with the first media asset to determine whether the portion of the second media asset matches content from the first media asset.

In some embodiments the media guidance application may edit the second media asset to remove the portion in response to determining that the portion of the second media asset matches the content from the first media asset. For example, the media guidance application may remove all frames from the second media asset corresponding to the portion.

In some embodiments, the media guidance application may generate an edited portion by increasing a perceived playback speed of the portion. For example, the media guidance application may generate an edited portion such that the edited portion comprises a fractional portion of the frames of the portion. The media guidance application may playback the edited portion such that the user may perceive the edited portion as a sped-up version of the portion.

In some embodiments, the media guidance application may edit the second media asset to replace the portion with the edited portion. For example, the media guidance application may remove all frames corresponding to the portion from the second media asset and may instead insert frames corresponding to the edited portion in the second media asset. In an example, the media guidance application may replace the portion with the edited portion such that a user perceives that the portion is being fast-forwarded during playback of the second media asset.

In some embodiments, the media guidance application may vary the perceived playback speed of the portion depending on a length of time since the user has last viewed the first media asset. For example, the media guidance application may retrieve, from a profile corresponding to the user, a time corresponding to the last time that a user viewed the first media asset. If the time is below a threshold time value, the media guidance application may increase the perceived playback speed to a fast rate. If the time is below the threshold time value, the media guidance application may decrease the perceived playback speed to a slow rate. The fast rate may be selected by the media guidance application as a rate that is greater than the slow rate. The slow rate may be selected by the media guidance application such that the slow rate is greater than the normal playback speed of the second media asset but slower than the fast rate.

In some embodiments, the media guidance application may generate for display the edited second media asset. For example, the media guidance application may generate for display on a display device associated with the media guidance application the edited second media asset.

In some embodiments, the media guidance application may present the user with an option to view the portion removed from the second media asset. For example, the media guidance application may generate for display a message informing the user that the portion contains content from a previously viewed media asset. The media guidance application may generate for display a prompt, prompting the user to decide if he or she wants to view the portion. The media guidance application may generate for display a variety of options such as an option to skip the portion, play the portion at a faster speed, play the portion at a normal speed, etc.

In some embodiments, the media guidance application may monitor user behavior of a population of users who consume the second media asset after consuming the first media asset. For example, the media guidance application may track user behavior, such as user interactions with a second media asset, for users who consume the second media asset after consuming the first media asset. For example, the media guidance application may record, in a database of user interactions, data evidencing how a user interacts with the second media asset (e.g., data evidencing whether a user fast-forwarded a portion of the second media asset, a location in the second media asset corresponding to the fast-forward command, etc.).

In some embodiments the media guidance application may detect fast-forward behavior corresponding to the portion by a threshold number of users of the population in response to the monitoring. For example, the media guidance application may store a variable which is incremented by the media guidance application each time a user of the population fast-forwards a portion of the media asset after viewing the first media asset. As an example, the media guidance application may detect behavior, from multiple users, fast-forwarding through a portion of the second media asset (e.g., a portion corresponding to an episode recap) after said users view a first media asset (e.g., an episode which may precede an episode of the second media asset). In some embodiments, the media guidance application may identify the portion and use the portion to compare the second media asset to the first media asset as described above.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

Figure 2:
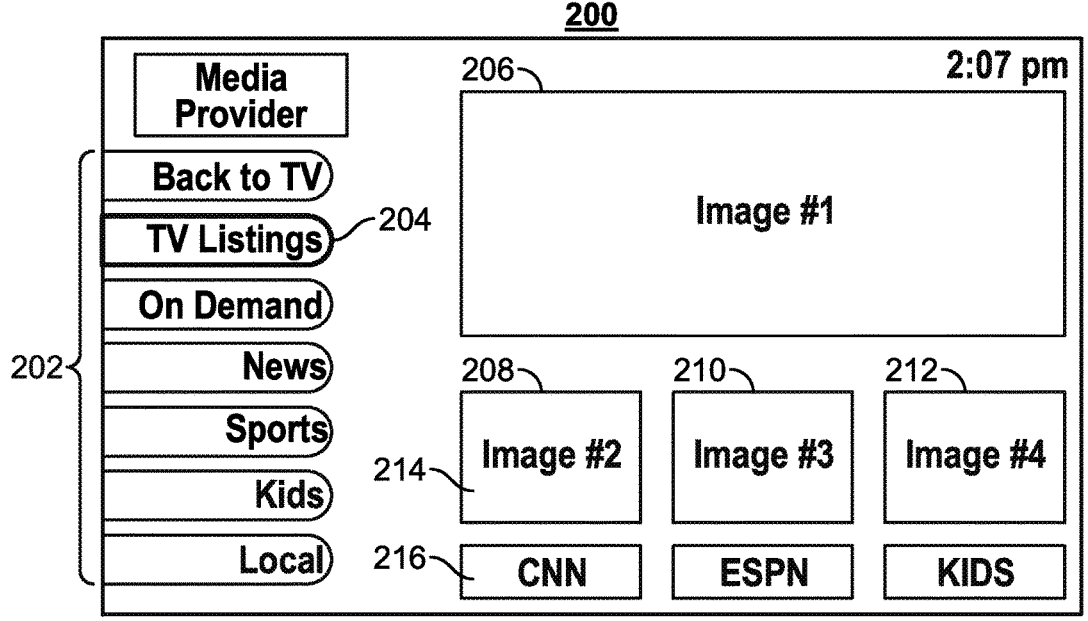
FIG. 2 shows another illustrative example of a media guidance display that may be presented in accordance with some embodiments of the disclosure.

In some embodiments, the media guidance application may detect that a user is about to consume a second media asset through user interaction with an element of the illustrative display screens depicted in FIGS. 1-2. FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
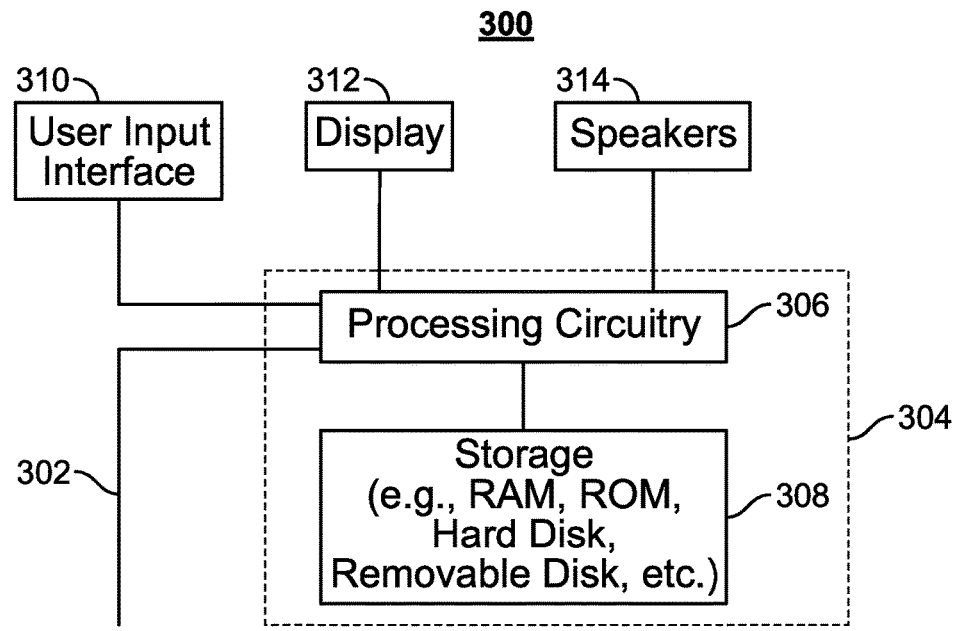
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays.

For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
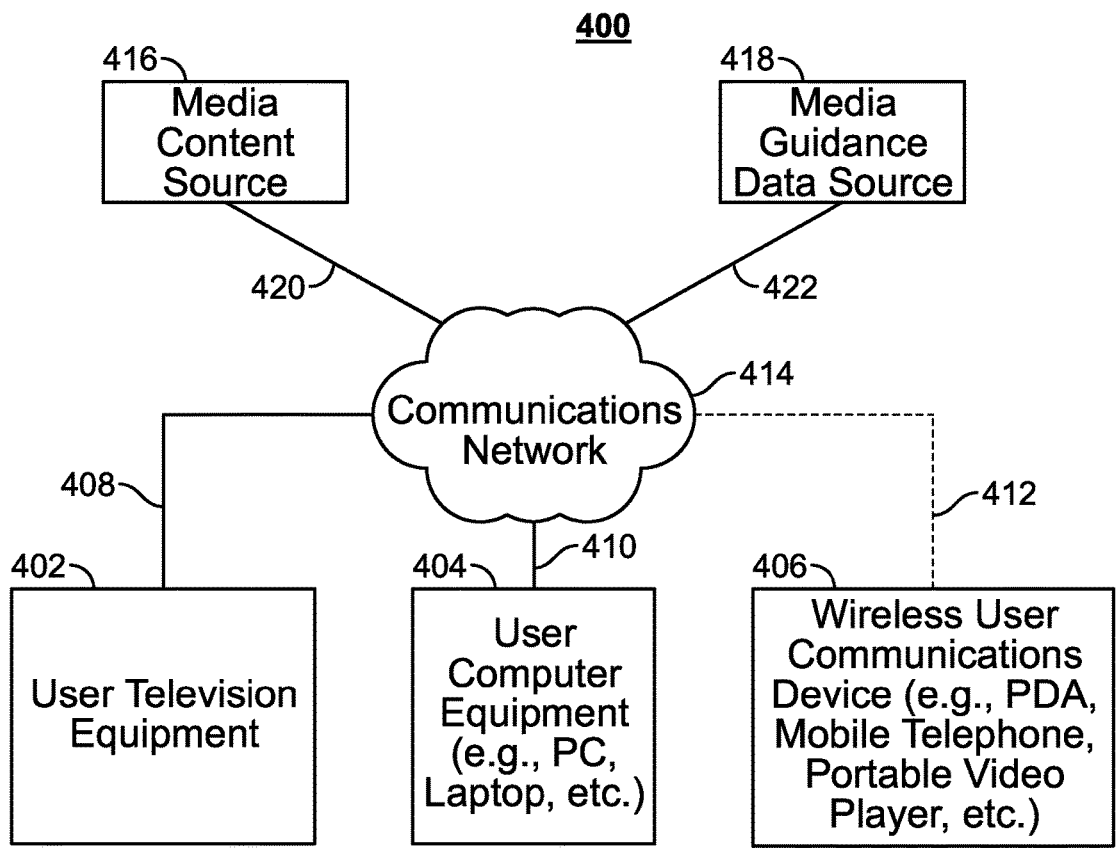
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
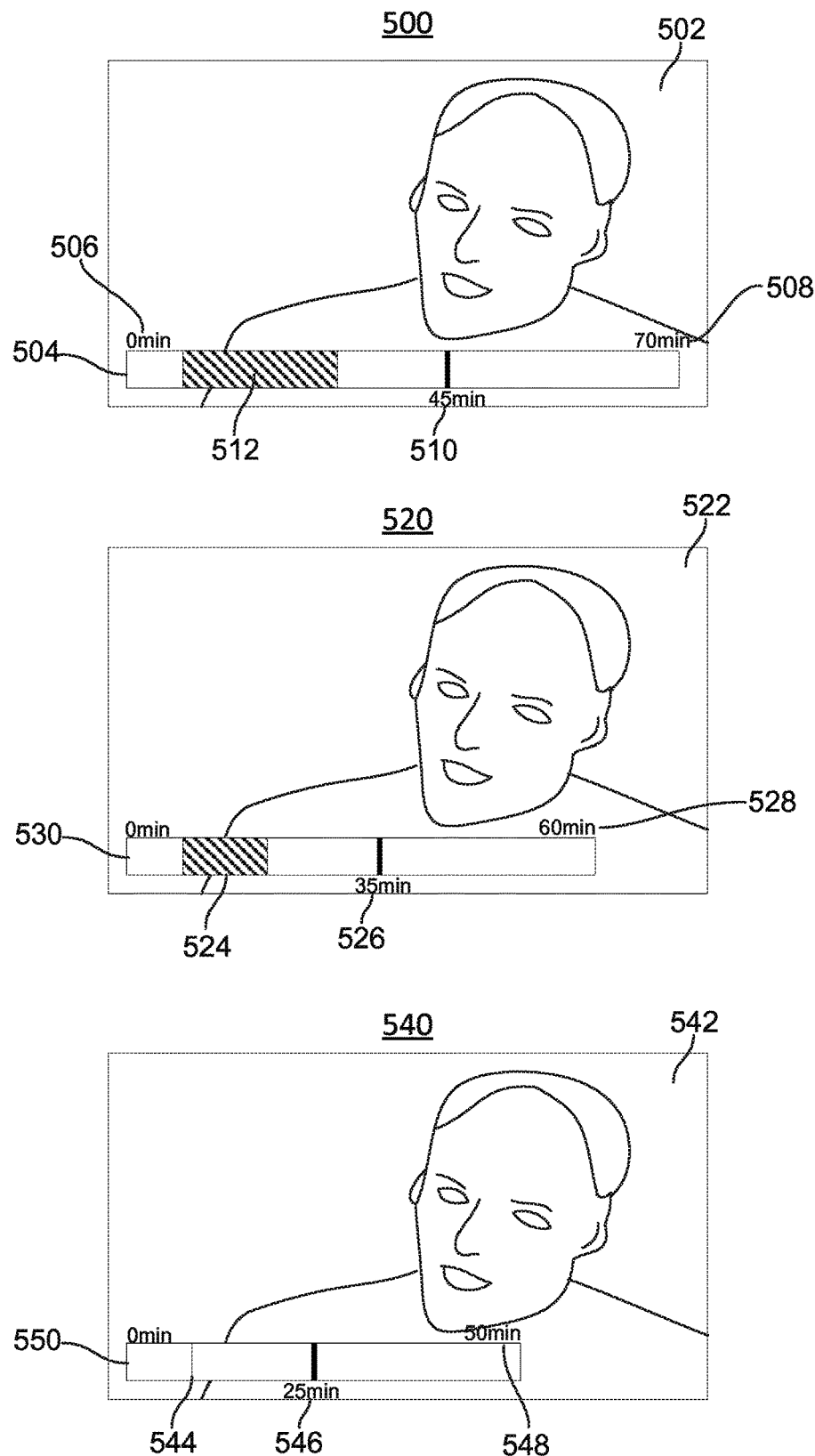
FIG. 5 shows an illustrative example of an original and edited media asset having overlapping content with another media asset in accordance with some embodiments of the disclosure.

FIG. 5 illustrates an example of a media guidance application generating for display (e.g., via control circuitry 304) edited versions of a media asset with varying degrees of removed content. Display 500 illustrates a display screen (e.g., display 312) in which an original version of the media asset is rendered. The media guidance application may generate for display media asset 502. Media asset 502 may comprise the second media asset as described above. The media guidance application may generate for display progress bar 504 for display on display 312. The media guidance application may generate for display, using control circuitry 304, progress bar 504 to serve as an indicator of the playback position in media asset 502. The media guidance application may vary the length of progress bar 504 based on the total play length of media asset 502. For example, the media guidance application may generate for display, using control circuitry 304, progress bar 504 for media asset 502 having a total playback time of 70 min. The media guidance application may generate for display, using control circuitry 304, total time indicator 508 at the end of progress bar 504 to indicate a total play time associated with media asset 502 and start time indicator 506 to indicate a start time associated with media asset 502. The media guidance application may generate for display, using control circuitry 304, current playback position and time 510 in progress bar 504. The media guidance application may compare, using control circuitry 304, media asset 502 to a previously consumed media asset indicated by a user profile associated with the user. The media guidance application may access, using control circuitry 304, a user profile stored on a local storage, such as storage 308, or a remote storage, such as media guidance data source 418 via communications network 414. The media guidance application may identify, using control circuitry 304, a portion of media asset 502 overlapping with the previously consumed media asset using the methods described above. The media guidance application may generate for display, using control circuitry 304, overlap indicator 512 in progress bar 504 to indicate to a user the portion of the content in media asset 502 overlapping with the previously consumed media asset.

Display 520 illustrates a display screen (e.g., display 312) in which media asset 502 is modified to remove a fraction of the portion. The media guidance application may edit media asset 502, using control circuitry 304, to remove a series of frames from the portion to reduce the size of the portion. For example, media guidance application may remove every other frame from the portion to generate an edited portion which comprises half of the number of frames in the portion. The media guidance application may replace the portion in media asset 502 to generate a first edited media asset 522. The media guidance application may generate for display using control circuitry 304 first edited progress bar 530 corresponding to first edited media asset 522. The media guidance application may update first edited progress indicator 526, first edited total time indicator 528 and first edited overlap indicator 524 to correspond to first edited media asset 522.

Display 540 illustrates a display screen (e.g., display 312) in which media asset 502 is modified to remove the portion. The media guidance application may edit media asset 502 using control circuitry 304 to remove the frames corresponding to the portion to create second edited media asset 542. The media guidance application may generate for display using control circuitry 304 second updated edited progress bar 550 corresponding to second edited media asset 542. The media guidance application may generate for display updated second edited progress indicator 546, second edited total time indicator 548 and second edited overlap indicator 544 corresponding to second edited media asset 542.

Figure 6:
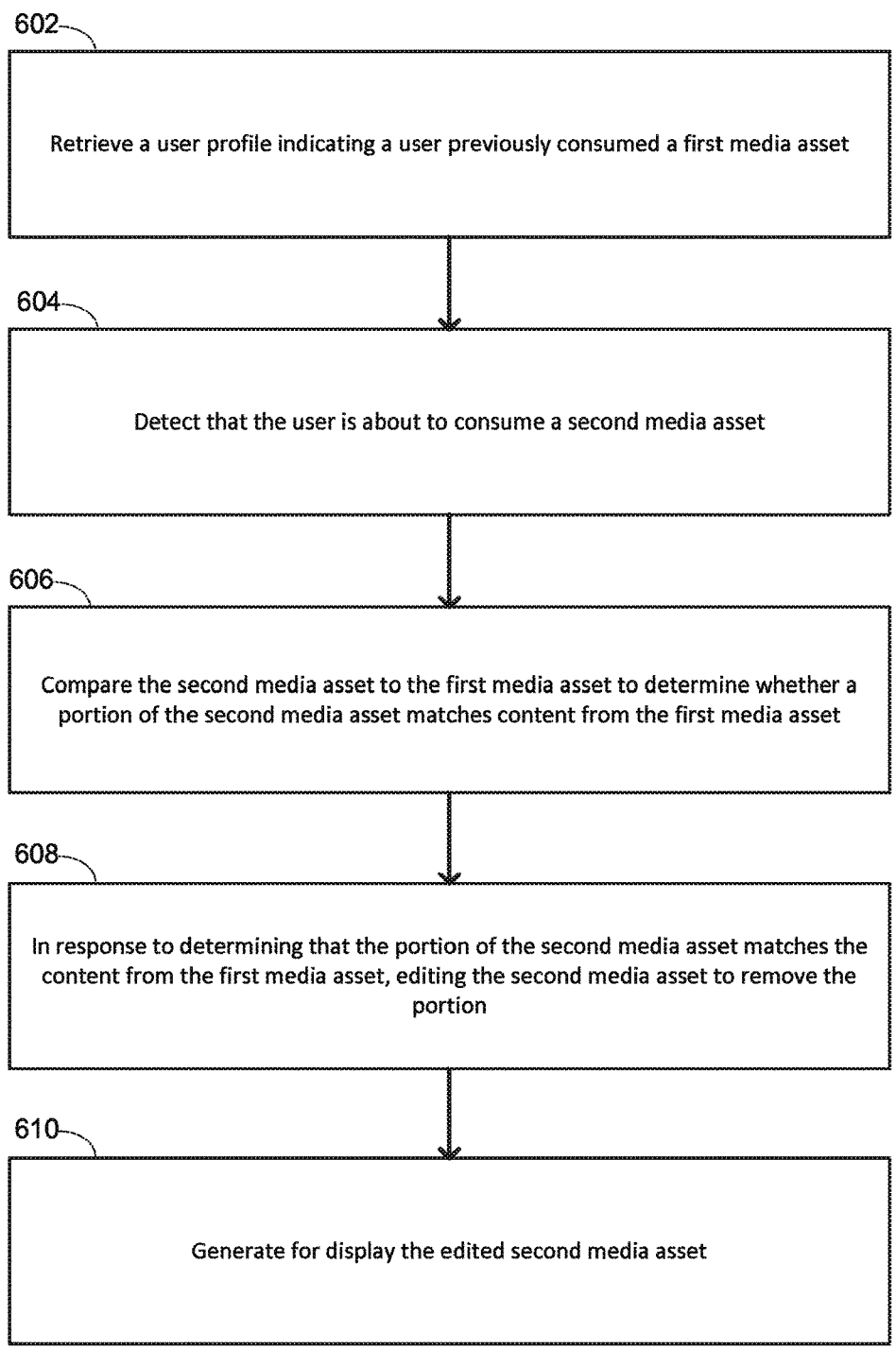
FIG. 6 is a flow chart of illustrative steps for editing a media asset having overlapping content with another media asset in accordance with some embodiments of the disclosure.

FIG. 6 depicts a flow chart of illustrative steps for generating for display an edited media asset such as first edited media asset 522 or second edited media asset 542. It should be noted that process 600, or any step thereof, could be performed on, or provided by, any of the devices shown in FIGS. 3-5. For example, process 600 may be executed by control circuitry 304 as instructed by a media guidance application implemented on user equipment 402, 404, 406 in order to generate for display an edited media asset. In addition, one or more steps of process 600 may be incorporated into or combined with one or more steps of any other process or embodiment (e.g., process 700).

At step 602, the media guidance application retrieves a user profile indicating a user previously consumed a first media asset. For example, the media guidance application may access, using control circuitry 304, a remote or local data storage location (e.g., media guidance data source via communications network 414 or storage 308) to retrieve a user profile associated with the user. The media guidance application may select, using the methods described above, a first media asset previously consumed by the user in the profile.

At step 604, the media guidance application may detect that the user is about to consume a second media asset. For example, the media guidance application may detect, using control circuitry 304, at user input interface 310, a request from a user to consume a second media asset. In another example, the media guidance application may detect a network packet containing a request from a user to consume a second media asset. In another example, the media guidance application may detect voice input at user input interface 310 and may process, using processing circuitry 306, the voice input to determine a second media asset requested by a user. As an example, the media guidance application may detect that the user is about to consume media asset 502.

At step 606, the media guidance application may compare the second media asset to the first media asset to determine whether a portion of the second media asset matches content from the first media asset. For example, the media guidance application may use control circuitry 304 to identify a portion of the second media asset for the comparison. The media guidance application may choose a portion of the second media asset by identifying a portion of the second media asset that is frequently fast-forwarded by a threshold number of users of a population of users as described above. The media guidance application may compare a frame of the first media asset to a frame of the portion. The media guidance application my access a database, remote or local to the media guidance application, (e.g., media guidance data source 418 or storage 308) to retrieve a plurality of frames associated with the first media asset for the comparison. This is just an exemplary method for comparing the first and second media asset to determine whether a portion of the second media asset matches content from the first media asset. The media guidance application may use control circuitry 304 for performing any of the methods described above for the comparison. As a result of the comparison, the media guidance application may generate for display a overlap indicator 512 corresponding to a portion of the media asset that overlaps with the first media asset.

At step 608, the media guidance application may edit the second media asset to remove the portion in response to determining that the portion of the second media asset matches the content from the first media asset. For example, the media guidance application may use control circuitry 304 to automatically remove all frames corresponding to the portion from the second media asset to create an edited second media asset. As an example, the media guidance application may generate second edited media asset 542 as a result of removing the portion. The media guidance application may generate for display second overlap indicator 544 with negligible width since the portion is removed. In another example, the media guidance application may receive user input at user input interface 310 indicating that a user wants to fast-forward through the portion. The media guidance application may generate, using control circuitry 304, an edited second media asset wherein a proportion of the frames of the portion are removed from the second media asset to create the edited second media asset. For example, the media guidance application may edit media asset 502 to create first edited media asset 522. The media guidance application may generate for display first edited overlap indicator 524 shorter than overlap indicator 512 to indicate the first edited media asset contains less overlap than media asset 502.

At step 610, the media guidance application may generate for display the edited second media asset. For example, the media guidance application may generate for display on display 312, using control circuitry 304, first edited media asset 522 or second edited media asset 542.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 6.

Figure 7:
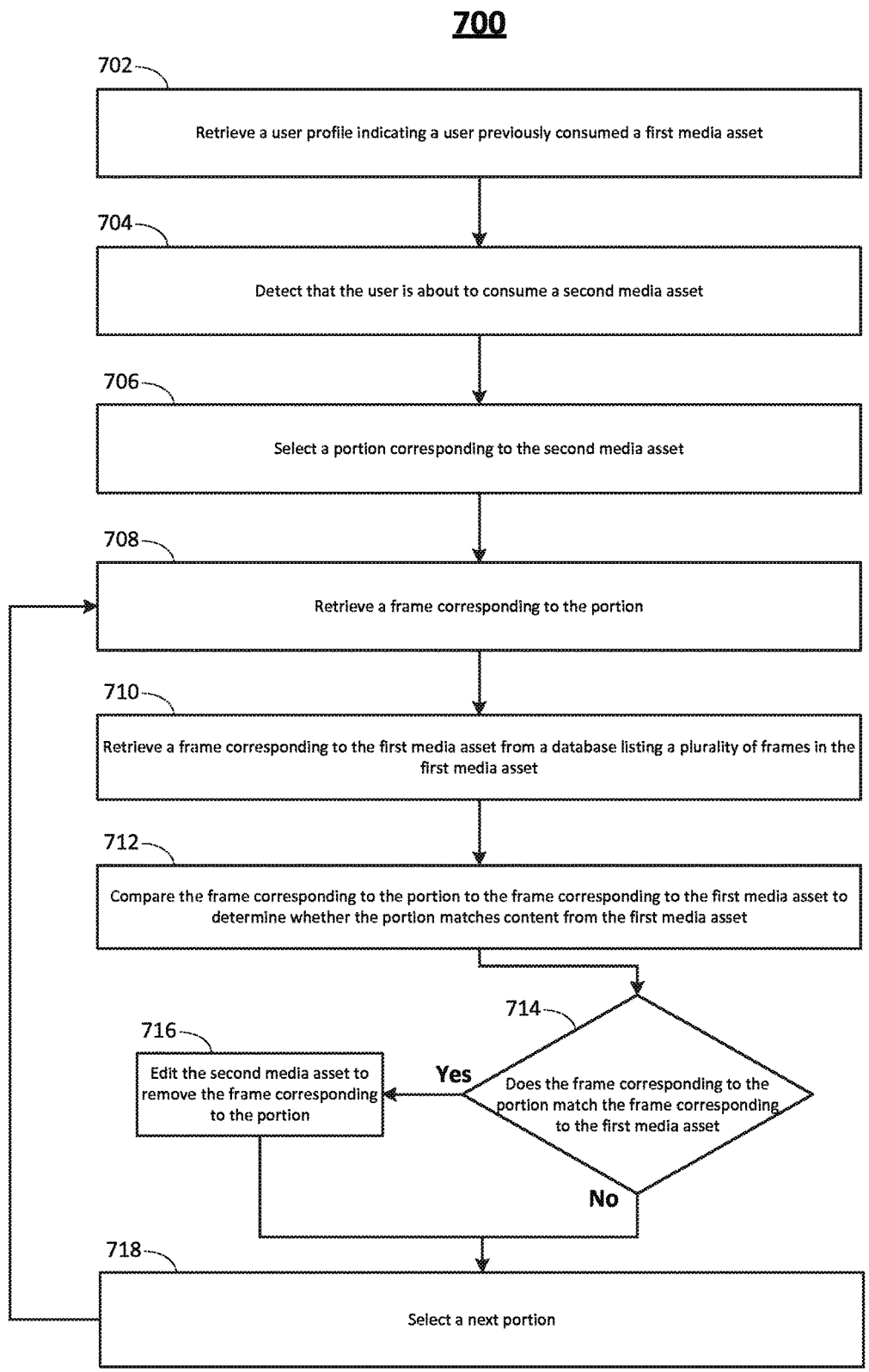
FIG. 7 is a flow chart of illustrative steps for editing frames of a media asset having overlapping content with another media asset in accordance with some embodiments of the disclosure.

FIG. 7 depicts a flow chart of illustrative steps for editing media asset 502. It should be noted that process 700, or any step thereof, could be performed on, or provided by, any of the devices shown in FIGS. 3-5. For example, process 700 may be executed by control circuitry 304 as instructed by a media guidance application implemented on user equipment 402, 404, 406 in order to edit media asset 502. In addition, one or more steps of process 700 may be incorporated into or combined with one or more steps of any other process or embodiment (e.g., process 600).

At step 702, the media guidance application may retrieve a user profile indicating a user previously consumed a first media asset. For example, the media guidance application may use control circuitry 304 to access a database containing a profile associated with a user. The media guidance application may access a listing of previously consumed media assets and may select a first media asset from the listing of media assets.

At step 704, the media guidance application may detect that the user is about to consume a second media asset. For example, the media guidance application may monitor network data packets transmitted over communications network 414. As a result of the monitoring, the media guidance application may detect, using control circuitry 304, a packet containing data indicating the user is about to consume the second media asset (e.g., media asset 502). For example, the media guidance application may detect frame data in a packet corresponding to a media asset streamed from media content source 416.

At step 706, the media guidance application may select a portion corresponding to the second media asset. For example, the media guidance application may select, using control circuitry 304, a frame corresponding to the second media asset as the portion. In another example, the media guidance application may select, using control circuitry 304, a plurality of frames within the second media asset (e.g., media asset 502).

At step 708, the media guidance application may retrieve a frame corresponding to the portion. For example, the media guidance application may retrieve, using control circuitry 304, a frame corresponding to the second media asset (e.g., media asset 502) by requesting a frame from media content source 416 via communications network 414.

At step 710, the media guidance application may retrieve a frame corresponding to the first media asset from a database listing a plurality of frames in the first media asset. For example, the media guidance application may retrieve, using control circuitry 304, a frame corresponding to the first media asset by accessing a database having the plurality of frames associated with the first media asset (e.g., by accessing media content source 416 via communications network 414).

At step 712, the media guidance application may compare the frame corresponding to the portion to the frame corresponding to the first media asset to determine whether the portion matches content from the first media asset. For example, the media guidance application may employ, using control circuitry 304, an image processing algorithm to compare the frame corresponding to the portion with the frame corresponding to the first media asset. The media guidance application may determine that the frames match if the comparison using the image processing algorithm determines that the frames are similar by at least a threshold percentage.

At step 714, the media guidance application determines whether the frame corresponding to the portion matches the frame corresponding to the first media asset. As in an example described above, the media guidance application may determine, using an image processing algorithm running on control circuitry 304, whether the frames match by at least a threshold percentage. If the media guidance application determines, using control circuitry 304, that the frames match by at least a threshold percentage, the media guidance application proceeds to step 716. Otherwise, the media guidance application proceeds to step 718.

At step 716, the media guidance application edits the second media asset to remove the frame corresponding to the portion. For example, the media guidance application temporarily stores an edited second media asset (e.g., first edited media asset 522 or second edited media asset 542) locally in storage 308 or remotely in media content source 416 or media guidance data source 418 via communications network 414. The media guidance data source may update, using control circuitry 304, the edited second media asset (e.g., first edited media asset 522 or second edited media asset 542) by removing the frame corresponding to the portion, such that the frame is no longer included during playback of the edited second media asset.

At step 718, the media guidance application may select a next portion corresponding to the second media asset. For example, the media guidance application may select, using control circuitry 304, a next portion from the second media asset such that the next portion is preceded by the portion during playback. As an example, the media guidance application may select, using control circuitry 304, a plurality of frames corresponding to the second media asset as the portion. In another example, the media guidance application may select a single frame as the portion.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 7.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiments in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for enhancing a user viewing experience, the method comprising:

retrieving a user profile indicating a user previously consumed a first episode of a series;

detecting at a current time that the user is about to consume a second episode of the series, wherein the second episode of the series is different than the first episode of the series;

comparing the second episode of the series to the first episode of the series to determine whether a portion of the second episode of the series matches a portion of the first episode of the series, wherein the portion of the second episode of the series is a part of the second episode of the series that is distinguishable from another part of the second episode of the series, and wherein the portion of the first episode of the series is a part of the first episode of the series that is distinguishable from another part of the first episode of the series;
in response to determining that the portion of the second episode of the series matches the portion of the first episode of the series:
retrieving from the user profile a last time the user has accessed the first episode of the series;
computing a length of time since the last time based on a difference between the last time and the current time;
comparing the length of time to a threshold;
selecting one of a first playback rate or a second playback rate based on whether the length of time is less than the threshold, wherein the first playback rate is faster than the normal playback rate and wherein the second playback rate is faster than the first playback rate,
editing the second episode of the series such that the portion of the second episode of the series is played back at the selected playback rate; and
generating for display the edited second episode of the series.

2. The method of claim 1, wherein the portion of the second episode of the series is a subset of the frames of the second episode of the series.

3. The method of claim 1, wherein comparing the second episode of the series to the first episode of the series to determine whether the portion of the second episode of the series matches the portion of the first episode of the series comprises:
determining a frame of the second episode of the series that corresponds to the portion of the second episode of the series; and
cross-referencing the frame with a database listing a plurality of frames in the first episode of the series to determine whether the frame matches one of the plurality of frames.

4. The method of claim 1, wherein the portion of the second episode of the series is preceded by a second portion of the second episode of the series during playback of the second episode of the series.

5. The method of claim 1, wherein comparing the second episode of the series to the first episode of the series to determine whether the portion of the second episode of the series matches the portion of the first episode of the series comprises:
retrieving metadata corresponding to the portion of the second episode of the series; and
cross-referencing the metadata of the portion of the second episode of the series with a database listing metadata of the first episode of the series to determine whether the portion of the second episode of the series matches the portion of the first episode of the series.

6. The method of claim 1, wherein comparing the second episode of the series to the first episode of the series to determine whether the portion of the second episode of the series matches the portion of the first episode of the series comprises:
retrieving an event corresponding to the portion of the second episode of the series; and
cross-referencing the event of the portion of the second episode of the series with a database listing a plurality of events corresponding to the first episode of the series to determine whether the portion of the second episode of the series matches the portion of the first episode of the series.

7. The method of claim 1, further comprising:
monitoring user behavior of a population of users who consume the second episode of the series after consuming the first episode of the series;
in response to the monitoring, detecting fast-forward behavior corresponding to the portion of the second episode of the series by a threshold number of users of the population; and
in response to detecting the fast-forward behavior, identifying the portion of the second episode of the series for the comparing.

8. A system for enhancing a user viewing experience, the system comprising:
storage circuitry configured to store a user profile; and
control circuitry configured to:
retrieve the user profile indicating a user previously consumed a first episode of a series;
detect at a current time that the user is about to consume a second episode of the series, wherein the second episode of the series is different than the first episode of the series;
compare the second episode of the series to the first episode of the series to determine whether a portion of the second episode of the series matches a portion of the first episode of the series, wherein the portion of the second episode of the series is a part of the second episode of the series that is distinguishable from another part of the second episode of the series, and wherein the portion of the first episode of the series is a part of the first episode of the series that is distinguishable from another part of the first episode of the series;
in response to determining that the portion of the second episode of the series matches the portion of the first episode of the series:
retrieve from the user profile a last time the user has accessed the first episode of the series;
compute a length of time since the last time based on a difference between the last time and the current time;
compare the length of time to a threshold;
select one of a first playback rate or a second playback rate based on whether the length of time is less than the threshold, wherein the first playback rate is faster than the normal playback rate and wherein the second playback rate is faster than the first playback rate,
edit the second episode of the series such that the portion of the second episode of the series is played back at the selected playback rate; and
generate for display the edited second episode of the series.

9. The system of claim 8, wherein the portion of the second episode of the series is a subset of the frames of the second episode of the series.

10. The system of claim 8, wherein the control circuitry configured to compare the second episode of the series to the first episode of the series to determine whether the portion of the second episode of the series matches the portion of the first episode of the series is further configured to:
determine a frame of the second episode of the series that corresponds to the portion of the second episode of the series; and cross-reference the frame with a database listing a plurality of frames in the first episode of the series to determine whether the frame matches one of the plurality of frames.

11. The system of claim 8, wherein the portion of the second episode of the series is preceded by a second portion of the second episode of the series during playback of the second episode of the series.

12. The system of claim 8, wherein the control circuitry configured to compare the second episode of the series to the first episode of the series to determine whether the portion of the second episode of the series matches the portion of the first episode of the series is further configured to:
   retrieve metadata corresponding to the portion of the second episode of the series; and
   cross-reference the metadata of the portion of the second episode of the series with a database listing metadata of the first episode of the series to determine whether the portion of the second episode of the series matches the portion of the first episode of the series.

13. The system of claim 8, wherein the control circuitry configured to compare the second episode of the series to the first episode of the series to determine whether the portion of the second episode of the series matches the portion of the first episode of the series is further configured to:
   retrieve an event corresponding to the portion of the second episode of the series; and
   cross-reference the event of the portion of the second episode of the series with a database listing a plurality of events corresponding to the first episode of the series to determine whether the portion of the second episode of the series matches the portion of the first episode of the series.

14. The system of claim 8, wherein the control circuitry is further configured to:
   monitor user behavior of a population of users who consume the second episode of the series after consuming the first episode of the series;
   in response to the monitoring, detect fast-forward behavior corresponding to the portion of the second episode of the series by a threshold number of users of the population; and
   in response to detecting the fast-forward behavior, identify the portion of the second episode of the series for the comparing.

\* \* \* \* \*